K. E. PEILER.
MACHINE FOR MELTING GUM.
APPLICATION FILED SEPT. 8, 1916.

1,262,247.

Patented Apr. 9, 1918.
2 SHEETS—SHEET 2.

Inventor:
Karl E. Peiler
by Harry R. Williams
Att'y.

K. E. PEILER.
MACHINE FOR MELTING GUM.
APPLICATION FILED SEPT. 8, 1916.

1,262,247.

Patented Apr. 9, 1918.
2 SHEETS—SHEET 1.

Inventor:
Karl E. Peiler
by Harry R. Williams
Atty.

UNITED STATES PATENT OFFICE.

KARL E. PEILER, OF HARTFORD, CONNECTICUT, ASSIGNOR OF SIX-NINTHS TO BEECH-NUT PACKING COMPANY, OF CANAJOHARIE, NEW YORK, A CORPORATION OF NEW YORK, AND TWO-NINTHS TO WILLIAM A. LORENZ AND ONE-NINTH TO KARL E. PEILER, BOTH OF HARTFORD, CONNECTICUT.

MACHINE FOR MELTING GUM.

1,262,247.  Specification of Letters Patent.  Patented Apr. 9, 1918.

Application filed September 8, 1916. Serial No. 119,033.

*To all whom it may concern:*

Be it known that I, KARL E. PEILER, a citizen of the United States, residing at Hartford, in the county of Hartford and State of Connecticut, have invented a new and useful Improvement in Machines for Melting Gum, of which the following is a specification.

This invention relates to a machine which is designed for rendering soft solidified gum, such for instance, as chicle, which in its raw commercial condition contains more or less bark, small stones and other foreign matter.

The object of the invention is to provide an efficient machine which will rapidly melt the gum without heating it so hot as to cause deterioration and at the same time grind up the softer impurities, such as bark, and pass the harder substances, such as stones, which are not ground, and deliver the product in a continuous viscous stream in condition for subsequent treatment.

In the embodiment of the invention for attaining this end which is illustrated, there is an expansible hopper for receiving the gum to be reduced, the sections of the hopper being yieldingly held together and the side walls being designed so that they may be warmed when desired. In the lower part and closing the opening through the bottom of the hopper are two hollow cylinders that are designed to be heated for melting the gum and that have cutting grooves in their peripheral surfaces. These cylinders are rotated together at different rates of surface speed so that they will coöperate to carry away such gum as is melted and that flows between them, and disintegrate such solid matter as is contained in the gum, and that are hung so that they will separate and pass between them such substances as are so hard that they are not ground. Below and arranged in contact with the cylinders are scrapers (preferably heated) that remove from the cylinders and direct downward the viscous mass that is brought down by the cylinders.

Figure 3:
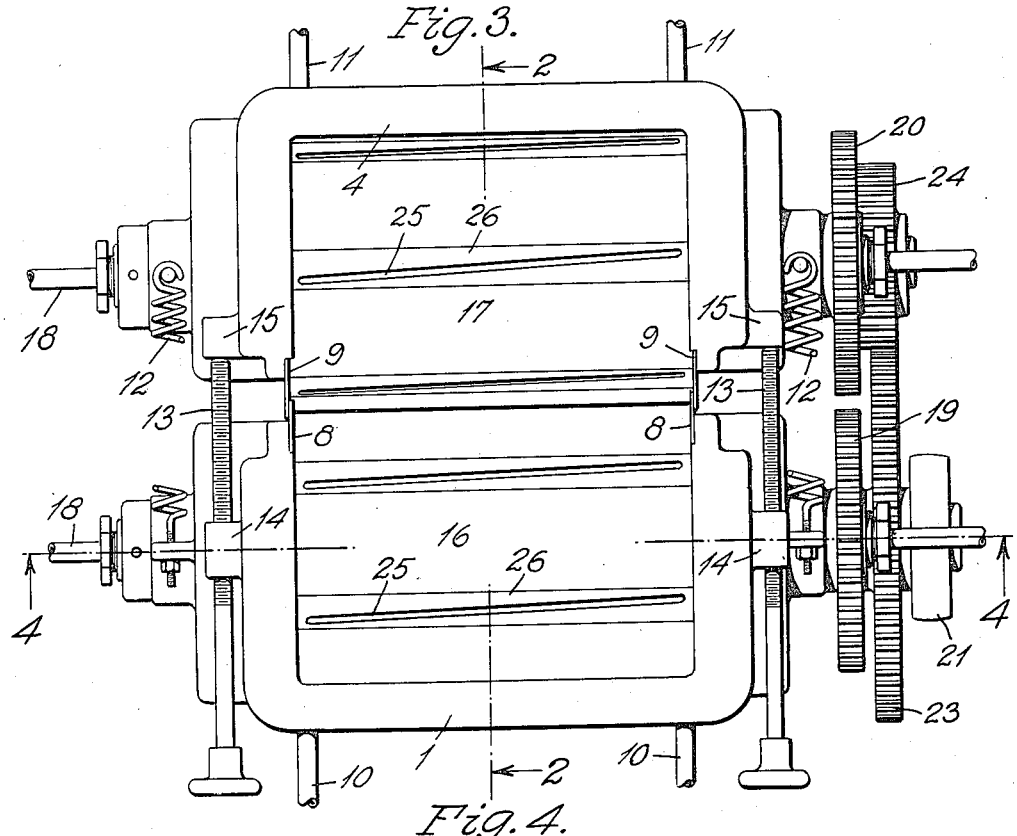
Figure 4:
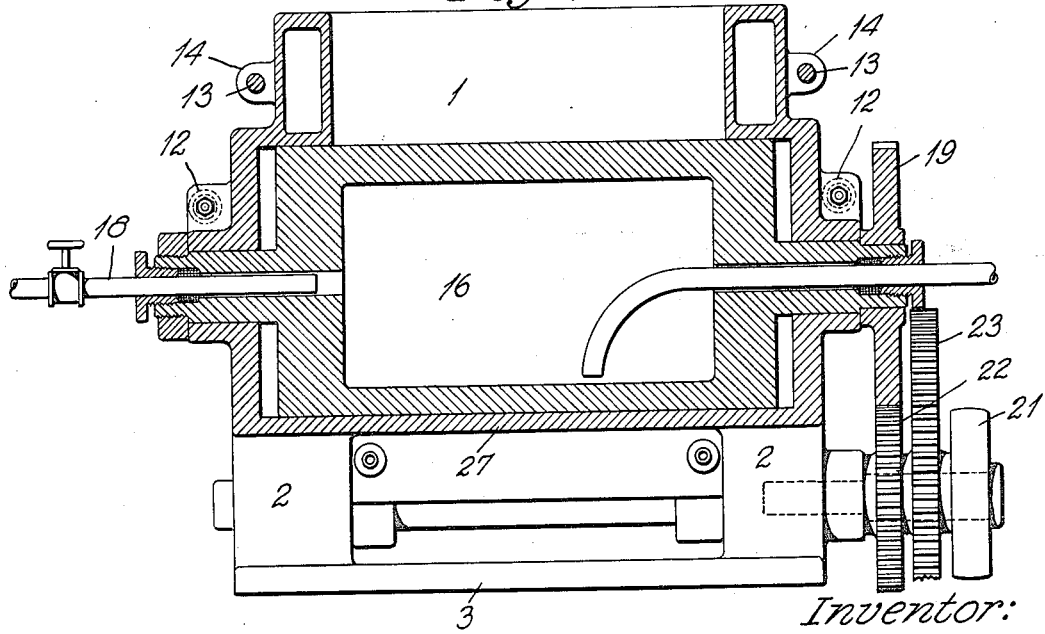
Figure 1:
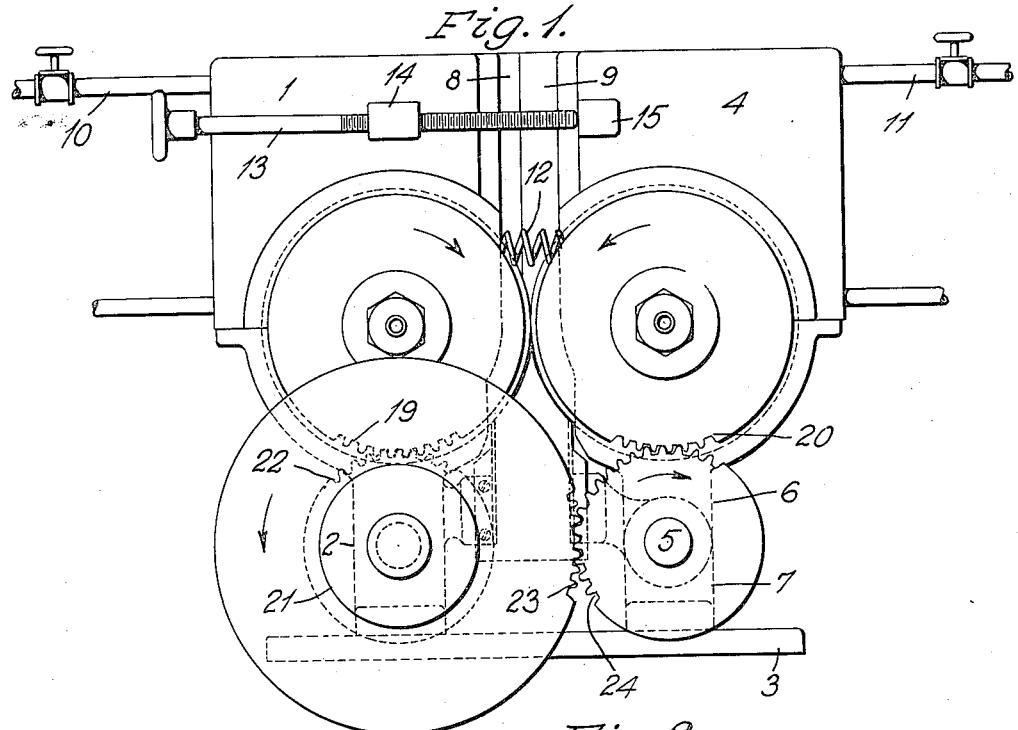
Figure 2:
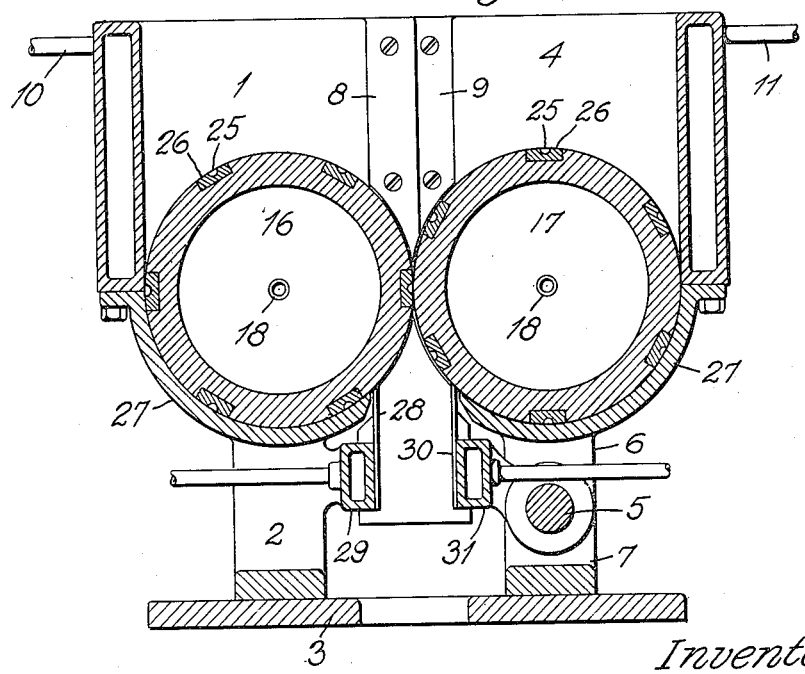

Figure 1 of the accompanying drawings shows a side elevation of the machine. Fig. 2 shows a vertical section of the machine on the plane indicated by the dotted line 2—2 on Fig. 3. Fig. 3 shows a plan of the machine. Fig. 4 shows a vertical section on the plane indicated by the dotted line 4—4 on Fig. 3.

The section 1 of the hopper that is illustrated is mounted on rigid legs 2 which are fastened to the base 3. The section 4 of the hopper is mounted on jointed legs, the shaft 5 forming the connecting joint between the upper parts 6 and the lower parts 7 of the legs. The meeting edges of the hopper sections are provided with flanges 8 and 9 that overlap so as to grip the side walls of the hopper tight and yet allow the section 4 to be swung on its joint toward or from the section 1. The walls of the hopper sections are desirably made hollow to permit them to be heated by steam from the pipes 10 and 11. Springs 12 are arranged at the sides so as to pull the hopper sections together, and screw rods 13 turning through lugs 14 on the fixed section against lugs 15 on the movable section determine the relative positions of the hopper sections.

The journals of the hollow cylinder 16 are mounted in bearings in the side walls of the hopper section 1, and the journals of the hollow cylinder 17 are mounted in bearings in the side walls of the hopper section 4. The journals are hollow so that steam may be admitted from the pipes 18 for heating the cylinders, and on one journal is a gear 19 and on the other a gear 20. Connected with the driving pulley 21 are a small gear 22 and a large gear 23, the former engaging directly with the cylinder gear 19 and the latter driving the cylinder gear 20 through the intermediate gear 24. As a result of this arrangement of driving gears the cylinder 17 is rotated much faster than the cylinder 16. The peripheral surfaces of the cylinders are provided with cutting grooves 25 desirably formed obliquely to the axis of the cylinders in hardened strips 26 which are inserted in the walls of the cylinders.

The bottom walls 27 of the hopper sections are curved so as to closely fit the cylinders. Arranged so that its upper edge engages with the periphery of the cylinder 16 is a scraper plate 28 which is attached to a heating box 29 that is fastened to the rigid legs of the hopper section 1, and arranged so that its upper edge engages with the periphery of the cylinder 17 is a scraper plate 30 which is attached to the heating box 31 that is fastened to the jointed leg of the hopper section 4.

In the type of machine illustrated the hopper section 4, the cylinder 17 which it carries, the cylinder gear 20 and the scraper 30 are mounted so as to swing on the axis of the shaft 5 which is coincident with the axis of the intermediate gear 24. This permits the cylinder 17 to be adjusted to the required degree toward or from the cylinder 16. The screw rods 13 determine the closing of this adjustment, and the springs 12 normally hold the parts together but yield and allow the cylinders to separate in case any large piece of material too hard to be ground attempts to pass between the cylinders.

The invention claimed is;

1. A machine for melting gum having a hopper with an opening through its bottom, a pair of cylinders having cutting grooves in their peripheries closing the opening through the bottom of the hopper, mechanism for rotating the cylinders, means for heating the cylinders, and scrapers engaging the peripheries of the cylinders below the line of contact of the cylinders.

2. A machine for melting gum having a hopper with an opening through its bottom, means for heating the hopper, a pair of cylinders having cutting grooves in their peripheries closing the opening through the bottom of the hopper, mechanism for rotating the cylinders, means for heating the cylinders, and scrapers engaging the peripheries of the cylinders below the line of contact of the cylinders.

3. A machine for melting gum having a sectional hopper with an opening through its bottom, means for adjusting the sections of the hopper toward and from each other, a grooved cylinder carried by each section of the hopper, said cylinders closing the opening through the bottom of the hopper, mechanism for rotating the cylinders, means for heating the cylinders, and scrapers engaging the peripheries of the cylinders below the line of contact of the cylinders.

4. A machine for melting gum having a sectional hopper, one section being fixed and the other movably mounted, means for adjusting the movable section of the hopper toward and from the fixed section of the hopper, a grooved cylinder carried by each section of the hopper, mechanism for rotating the cylinders, means for heating the cylinders, and scrapers engaging the peripheries of the cylinders below the line of contact of the cylinders.

5. A machine for melting gum having a hopper formed of two sections, one of which is fixed and the other is pivotally mounted, yielding means for drawing the pivotally mounted section toward the fixed section of the hopper, adjustable means for determining the relation of the pivoted to the fixed section of the hopper, a grooved cylinder carried by each section of the hopper, mechanism for rotating the cylinders, means for heating the cylinders, and scrapers engaging the peripheries of the cylinders below the line of contact of the cylinders.

6. A machine for melting gum having a hopper formed of two sections, one of which is fixed and the other is pivotally mounted, springs for drawing the sections together, screw rods for determining the normal relation of the sections, a grooved cylinder carried by each section of the hopper, mechanism for rotating the cylinders, means for heating the cylinders, and scrapers engaging the peripheries of the cylinders below the line of contact of the cylinders.

7. A machine for melting gum having a hopper with an opening through its bottom, a pair of grooved cylinders closing the opening through the bottom of the hopper, mechanism for rotating one cylinder faster than the other, means for heating the cylinders, and scrapers engaging the peripheries of the cylinders below the line of contact of the cylinders.

8. A machine for melting gum having a hopper with an opening through its bottom, a pair of cylinders closing the opening through the bottom of the hopper, hardened strips provided with cutting grooves set into the peripheral surfaces of the cylinders, mechanism for rotating one cylinder faster than the other, means for heating the cylinders, and scrapers engaging the peripheries of the cylinders below the line of contact of the cylinders.

9. A machine for melting gum having a hopper formed in two sections, one of which is fixed and the other is pivotally mounted, a grooved cylinder mounted in the fixed section of the hopper, a scraper mounted on the fixed section adjacent to the cylinder carried thereby, a grooved cylinder mounted in the pivoted section of the hopper, a scraper mounted on the pivoted section adjacent to the cylinder carried thereby, mechanism for rotating the cylinders at different rates of speed, yielding means drawing the fixed section toward the pivoted section of the hopper, and adjustable means for determining the normal relation of the hopper sections and the cylinders and scrapers carried thereby.

10. A machine for melting gum having a sectional hopper with an opening through its bottom, means for adjusting the sections of the hopper toward and from each other, a grooved cylinder carried by each section of the hopper, said cylinders closing the opening through the bottom of the hopper, mechanism for rotating the cylinders, and means for heating the cylinders.

11. Gum melting means comprising a pair of adjacent heated rotatable cylinders with cutting grooves in their peripheral surfaces, means for heating the cylinders, and mechanism for rotating the cylinders together in opposite directions at different rates of speed.

KARL E. PEILER.